(12) United States Patent
Jordison et al.

(10) Patent No.: US 8,578,624 B2
(45) Date of Patent: Nov. 12, 2013

(54) INDIRECT-HEAT THERMAL PROCESSING OF PARTICULATE MATERIAL

(75) Inventors: Neville Jordison, Millarville (CA); Niels A. Rozendaal, Zevenaar (NL); Peter Xingeun Huang, Richmond Hill (CA)

(73) Assignee: Solex Thermal Science Inc., Calgary (CA)

( * ) Notice: Subject to any disclaimer, the term of this patent is extended or adjusted under 35 U.S.C. 154(b) by 823 days.

(21) Appl. No.: 11/418,055

(22) Filed: May 5, 2006

(65) Prior Publication Data

US 2007/0256316 A1    Nov. 8, 2007

(51) Int. Cl.
*F26B 17/12*     (2006.01)
(52) U.S. Cl.
USPC .................. 34/167; 34/168; 34/177; 165/166
(58) Field of Classification Search
USPC ............. 34/167, 168, 174, 177, 65; 165/164, 165/166, 168, 170
See application file for complete search history.

(56) References Cited

U.S. PATENT DOCUMENTS

| | | | | | |
|---|---|---|---|---|---|
| 3,397,460 | A | * | 8/1968 | Hall ................................ | 34/168 |
| 4,292,743 | A | | 10/1981 | Razus | |
| 4,424,634 | A | * | 1/1984 | Westelaken ..................... | 34/167 |
| 4,679,620 | A | * | 7/1987 | Daun .............................. | 165/95 |
| 5,167,274 | A | * | 12/1992 | Mueller ......................... | 165/170 |
| 6,328,099 | B1 | | 12/2001 | Hilt et al. | |
| RE37,653 | E | | 4/2002 | Anderson | |

FOREIGN PATENT DOCUMENTS

| | | |
|---|---|---|
| DE | 3317204 | 10/1984 |
| JP | 2001041655 | 2/2001 |
| WO | 03001131 | 1/2003 |

OTHER PUBLICATIONS

Australian Office Action dated Dec. 9, 2010, issued from the corresponding Australian patent application.

\* cited by examiner

*Primary Examiner* — Jiping Lu
(74) *Attorney, Agent, or Firm* — Geoffrey deKleine; Borden Ladner Gervais LLP

(57) ABSTRACT

A method and apparatus for indirect-heat thermal processing of material, such as a dryer or evaporator for treatment of particulate material, is provided. In one embodiment, a dryer for drying particulate material comprises a plurality of heat transfer plates arranged in spaced relationship for the flow of the material to be dried therebetween. Each heat transfer plate is provided with an inlet and an outlet for the flow of the heating fluid through the plates. A purge fluid delivery system provides a flow of purge fluid, such as air, gas or steam between the plates in a direction across the direction of flow of the material to be dried. The purge fluid delivery system provides a flow path for the purge fluid which is isolated from the flow of the heating fluid through the plates. A method for the indirect-heat processing of particulate material is also provided.

15 Claims, 6 Drawing Sheets

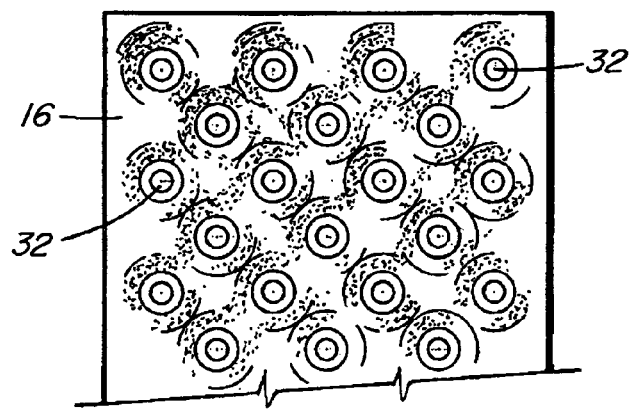
FIG. 2
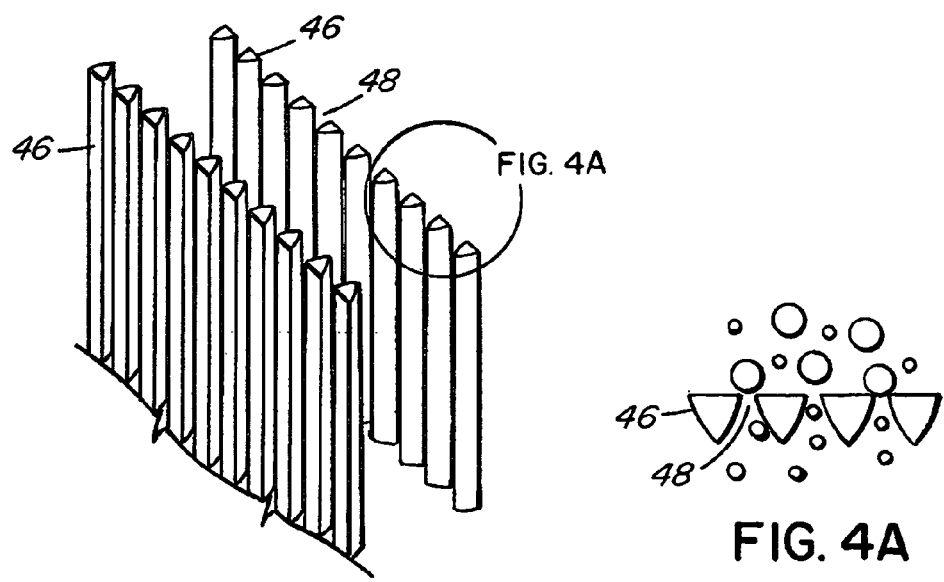
FIG. 4
FIG. 4A

INDIRECT-HEAT THERMAL PROCESSING OF PARTICULATE MATERIAL

FIELD OF THE INVENTION

This invention relates to a method and apparatus for indirect-heat thermal processing of material. In particular, but not exclusively, the invention relates to a dryer for particulate material. Examples of the material which can be dried by the dryer, are soybeans, canola and sunflower seeds.

BACKGROUND OF THE INVENTION

Conventional dryers typically only use hot air for drying. The material to be dried flows by gravity through the dryer. All of the heat for drying is provided by the hot air, which, as it picks up moisture, quickly cools and becomes saturated. The exhaust air typically is vented through a scrubbing system to atmosphere.

The disadvantage of this system is that it is very inefficient for energy utilization, typically achieving only about 30% in old fashioned dryers and between 30 to 50% efficiency in the best available technology. Where efficiency is measured in terms of:

Theoretical Energy Required to Evaporate Water
Total energy input

Increasing the inlet air temperature improves the efficiency, however it is limited by the maximum temperature the product can withstand without degradation, which for products such as oilseeds is quite low. The exhaust air contains a lot of waste heat which is difficult to recover.

As a modification of this basic design, in an attempt to improve the efficiency, steam heated tubes have been included to provide a source of indirect heating.

During the drying process, water from the material being dried is turned into water vapor which needs to be removed. It has been attempted to remove the water vapor by introducing a purge air stream into the bed or column of material being dried to absorb the water vapor, with an approach to the saturation point of the air. In a commercial scale plant, due to the large capacity and drying required, this requires large quantities of air. A simple solution would be to introduce purge air at the bottom of the column and exiting at the top of the column. However, in this configuration, with any reasonable column length, the pressure drop across the column for the required quantity of air becomes very high, requiring a compressor (or blower) and a pressurized container, undesirable from many points of view: e.g. design complexity, capital and operational cost, etc.

It is an object of the present invention to alleviate the above-mentioned problems.

SUMMARY OF THE INVENTION

According to the invention, there is provided a method of drying particulate material comprising the steps of introducing the material into flow passages defined between a plurality of spaced heat transfer plates; permitting the material to flow in choked flow under the force of gravity through the flow passages defined between the heat transfer plates; passing a heating fluid through the heat transfer plates, thereby to subject the material flowing through the flow passages to indirect heating; and simultaneously causing a flow of a purge fluid through the material being subjected to indirect heating in a direction across the flow of the material, thereby to remove moisture generated by the indirect heating of the material, the flow of the heating fluid through the heat transfer plates being isolated from the flow of purge fluid.

Also according to the invention there is provided a method of removing volatiles from bulk solid material comprising the steps of introducing the material into flow passages defined between a plurality of spaced heat transfer plates; permitting the material to flow in choked flow under the force of gravity through the flow passages defined between the heat transfer plates; passing a heating fluid through the heat transfer plates, thereby to subject the material flowing through the flow passages to indirect heating; and simultaneously causing a flow of purge fluid through the material being subjected to indirect heating in a direction across the flow of the material, thereby to remove evaporated volatiles generated by the indirect heating of the material, the flow of the heating fluid through the heat transfer plates being isolated from the flow of purge fluid.

The purge fluid may be air or a gas, such as nitrogen.

The purge fluid may be superheated steam. The steam may be at a low pressure, such as below atmospheric pressure, or at atmospheric pressure or at a pressure above atmospheric pressure.

For the sake of efficiency, waste heat from elsewhere in a particular thermal process may be recovered and used for heating the heating fluid, as well as the purge air, if desired.

The method may be carried out under negative pressure, i.e. below atmospheric pressure to improve the efficiency thereof.

Further according to the invention there is provided a dryer for drying particulate material comprising a plurality of heat transfer plates arranged in spaced relationship for the flow of the material to be dried therebetween, each heat transfer plate being provided with an inlet and an outlet for the flow of a heating fluid through the plates and a purge fluid delivery system arranged for providing a flow of purge fluid between the plates in a direction across the direction of flow of the material to be dried, wherein the purge fluid delivery system provides a flow path for the purge fluid which is isolated from the flow of the heating fluid through the plates.

Also according to the invention there is provided an evaporator for removing volatiles from bulk solid material comprising a plurality of heat transfer plates arranged in spaced relationship for the flow of the material therebetween, each heat transfer plate being provided with an inlet and an outlet for the flow of a heating fluid through the plates and a purge fluid delivery system arranged for providing a flow of purge fluid between the plates in a direction across the direction of flow of the material, wherein the purge fluid delivery system provides a flow path for the purge fluid which is isolated from the flow of the heating fluid through the plates.

Further according to the invention there is provided a dryer for drying particulate material comprising a plurality of heat transfer plates arranged in spaced relationship for the flow of the material to be dried therebetween, each heat transfer plate being provided with an inlet and an outlet for the flow of a heating fluid through the plate, and a purge fluid delivery system arranged for providing a flow of purge fluid in a direction across the direction of flow of the material to be dried, the flow of purge fluid extending through the heat transfer plates and isolated from the flow of heating fluid through the heat transfer plates.

Also according to the invention there is provided an evaporator for removing volatiles from bulk solid material comprising a plurality of heat transfer plates arranged in spaced relationship for the flow of the material therebetween, each heat transfer plate being provided with an inlet and an outlet for the flow of a heating fluid through the plate, and a purge fluid delivery system arranged for providing a flow of purge fluid in a direction across the direction of flow of the material, the flow of purge fluid extending through the heat transfer plates and isolated from the flow of heating fluid through the heat transfer plates.

The heat transfer plates may be provided with holes or openings therein for the flow of purge fluid through the plates and the purge fluid delivery system may comprise at least one inlet plenum and at least one exhaust plenum with the heat transfer plates interposed between the plenums.

The heat transfer plates may comprise conventional dimpled plates with holes cut inside the weld of the dimpled plates. Preferably, the holes are at least 12 mm in diameter to maintain an air velocity through the holes of below 5 m/s. However, these values may vary depending on the particular application.

Each of the inlet and outlet plenums may have an air pervious side facing the heat transfer plates.

The heat transfer plates may be arranged in banks of plates, each bank comprising one or more plates, and the purge fluid delivery system may comprise inlet and exhaust plenums interposed between the banks of plates.

Each of the inlet and outlet plenums may have a pair of opposed air pervious sides. For example, the sides may comprise a perforated material, wire screens or steep angled louver.

According to another embodiment, the purge fluid delivery system may comprise at least one air pervious inlet pipe or tube extending transversely of the direction of flow of the material and through the heat transfer plates for delivery of purge fluid to the dryer or evaporator and at least one air pervious exhaust pipe or tube extending transversely of the direction of flow of the material and through the heat transfer plates for the exhaust of purge fluid from the dryer or evaporator.

Further objects and advantages of the invention will become apparent from the description of preferred embodiments of the invention below.

BRIEF DESCRIPTION OF THE DRAWINGS

The invention will now be described by way of examples, with reference to the accompanying drawings. Specific details of certain embodiment(s) of the present apparatus/method are set forth in detailed description below and illustrated in the enclosed Figures to provide an understanding of such embodiment(s). Persons skilled in the technology involved here will understand, however, that the present apparatus/method has additional embodiments, and/or may be practiced without at least some of the details set forth in the following description of preferred embodiment(s).

In the drawings:

FIG. 2 is a side view of part of a dimpled heat transfer plate of the dryer of FIG. 1;

FIG. 4 is a three-dimensional partial view of an air inlet or outlet plenum of the dryer of FIG. 1;

DETAILED DESCRIPTION OF THE PREFERRED EMBODIMENTS

Figure 1:
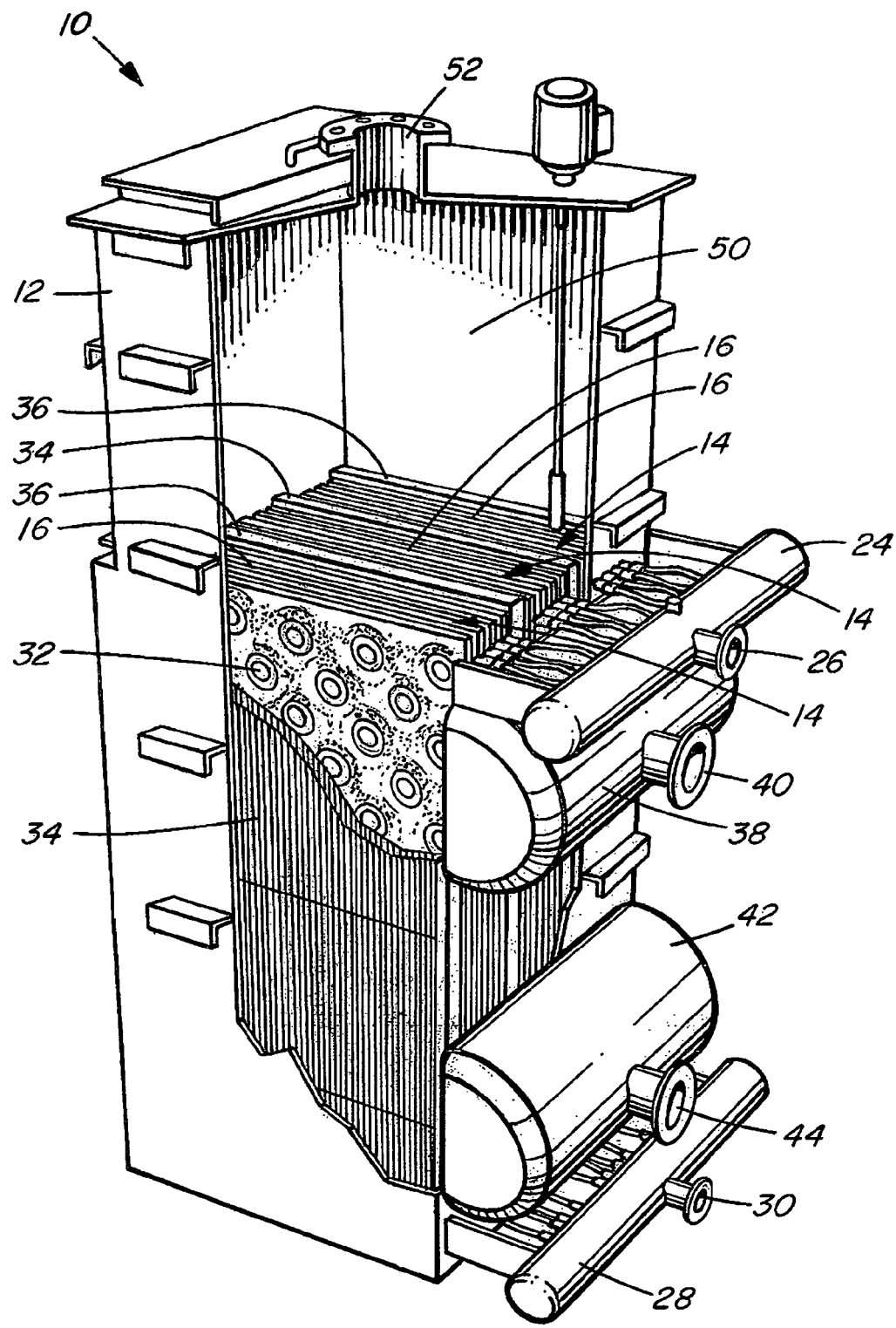
FIG. 1 is a three-dimensional view, partly cut away, of a dryer for particulate material.

In the following description, certain specific details are set forth in order to provide a thorough understanding of various embodiments of the invention. However, one skilled in the art will understand that the invention may be practiced without these details. In other instances, well known structures associated with the technology have not been described in detail to avoid unnecessarily obscuring the descriptions of the embodiments of the invention.

Unless the context requires otherwise, throughout the specification and claims which follow, the word "comprise" and variations thereof, such as "comprises" and "comprising" are to be construed in an open, inclusive sense, that is as "including but not limited to."

Referring to the drawings, reference numeral 10 generally indicates a dryer or evaporator comprising a housing 12 which contains several banks 14 of one or more hollow heat transfer plates 16. In the present example, there are four heat transfer plates 16 in each plate bank 14. The plates 16 in each bank 14 are arranged in parallel spaced relationship for the flow of particulate material 18, which is to be dried, therebetween. The direction of flow of the material 18 is indicated by arrows 17 in FIG. 3.

Each plate 16 has an inlet 20 for the introduction of a heating fluid, such as steam, and an outlet 22, for discharging the cooled heating fluid, e.g. condensate if steam is used as heating fluid. For example, low pressure steam at about 110° C. may be used as the heating fluid.

The inlets 20 are connected to a heating fluid manifold 24, which in turn, during use, is connected to a source of heating fluid through opening (nozzle) 26. The outlets 22 are connected to a manifold 28 from which the spent heating fluid is discharged through opening 30. If a heating liquid is used, such as hot water, the connections would be reversed, with the liquid entering through opening 30 and exiting through opening 26.

Each plate 16 is provided with holes or openings 32 therein, which are sealed around their peripheries, for the flow of purge air through the plates 16, as will be described below. To improve efficiency, the openings 32 in adjacent plates 16 are offset with respect to each other, as more clearly shown in FIG. 5.

The plate banks 14 are provided with air inlet plenums 34 for the provision of purge air and air outlet plenums 36 for exhausting the spent purge air.

The air inlet plenums 34 are connected to a purge air manifold 38 which is connected to a source of air, through opening 40, and the air outlet plenums 36 are connected to a purge air manifold 42 from which the purge air is exhausted through opening 44.

The purge air inlet and outlet plenums 34, 36 have air pervious sides facing the heat transfer plates 16. The air pervious sides can be of any suitable material which will allow the passage of purge air therethrough but at the same time counteract the entry of the material 18 being dried into the plenums 34, 36.

Figure 3:
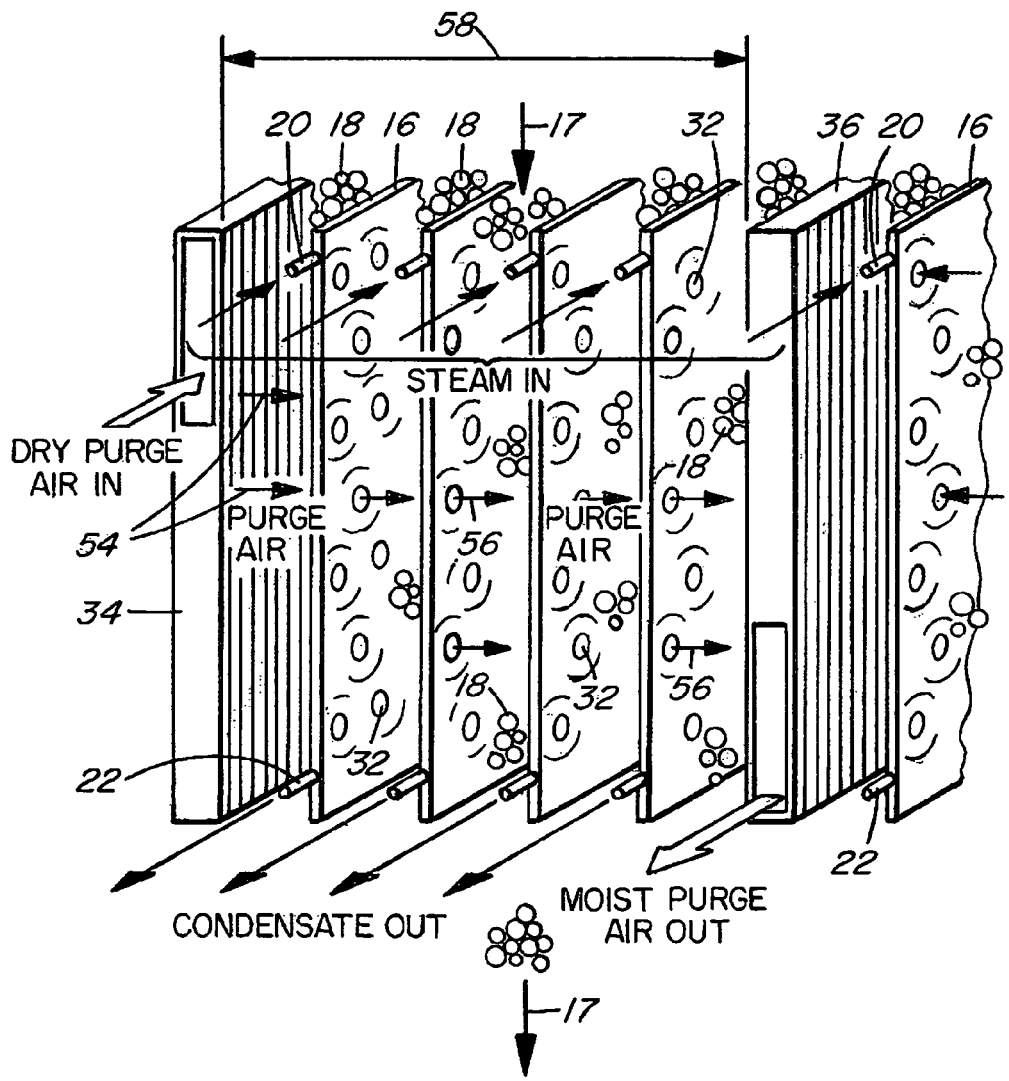
FIG. 3 is a schematical three-dimensional view of part of the interior of the dryer of FIG. 1, showing a number of heat transfer plates, with associated air inlet and outlet plenums, and particulate material flowing downwardly between the plates.

In the example illustrated in FIGS. 1, 3 and 4, the air-pervious sides are formed of wedge-wire screens for the passage of air therethrough. The screens are formed by elongate members 46, as shown in FIG. 4, which have triangular or V-shaped cross-sectional profiles and are arranged to form a smooth outside surface, i.e. the bases of the triangular profiles face outwardly. There is a gap 48 of about 1 to 3 mm between adjacent members 46. The effect of this arrangement is that clogging of the plenums 34, 36 is counteracted. While small particles can pass through the gap 48, larger particles are prevented from doing so and, due to the smooth outside profile, these particles can slide downwardly along the sides of the plenums 34, 36.

As shown in FIGS. 1 and 3, the plenums 34, 36 are interposed between the plate banks 14. In this way, adjacent plate banks 14 share the inlet plenum 34 interposed between them and adjacent plate banks 14 share the outlet plenum 36 interposed between them.

The housing 12 forms a hopper 50 above the plate banks 14 and has an inlet 52 for introducing material to be dried into the hopper 50. The housing 12 has an outlet (not shown) on its underside for the outflow of dried material from the dryer 10. A mass flow device or discharge hopper (not shown) is provided at the outlet that creates mass flow or choked flow of the material being dried through the drier 10 and regulates the flow rate of the material. An example of such a mass flow device or discharge hopper is described in U.S. Pat. No. 5,167,274, which is incorporated herein by reference.

The term "choked flow" in this specification means a flow other than a free fall of the individual particles under the force of gravity.

During operation of the dryer 10, the material to be dried, such as soybeans, flows downwardly from the hopper 50 in choked flow under the force of gravity between the heat transfer plates 16 while heating fluid is circulating through the plates 16.

In order to remove any gaseous emissions from the material being dried, such as water vapour in the case of soybeans, relatively dry air (purge air) is introduced into the air inlet plenums 34 e.g. by means of a fan (not shown) via the inlet manifold 38. From the plenums 34 the purge air flows sideways through the wedge-wire screens of the plenums 34 (as shown by arrows 54 in FIG. 3) in a direction across the direction of flow of the material being dried and through the openings 32 in the plates 16, as shown by the arrows 56 in FIG. 3.

The drying of the material 18 occurs as a result of the combination of the heat generated by the heating fluid circulating through the plates 16 and the dry air environment. In order to improve the efficiency of the process the purge air may be hot air.

The flow of the heating fluid through the plates 16 is separate from the flow of purge air through the openings 32 in the plates 16. This is as a result of the openings 32 being sealed around their peripheries, as mentioned before.

The purge air is sucked into the air outlet plenums 36, e.g. by an extractor fan (not shown) downstream of the air outlet manifold 42. During this flow of purge air through the material 18 being dried, gaseous emissions generated during the drying process are carried along with the purge air and are exhausted with the purge air. For example, in the case of soybeans, moist air will be exhausted from the plenums 36.

The bed depth through which the purge air must flow can be controlled by selecting an appropriate number of plates 16 between the inlet and outlet plenums 34, 36, e.g. the number of plates 16 may depend on the nature of the material being dried (permeability of the bed). For example, for relatively coarse material the bed depth may be increased, whereas it may be decreased for less coarse material. In this way a manageable bed depth is achieved for the purge air. The requirement here is to achieve the necessary balance between air flow required to remove the moisture and available pressure drop from the fans.

It can be seen from the above that the invention provides a way to work with thin bed depths that will operate with pressure drops within the range of a radial flow fan, thereby alleviating the problems encountered in conventional methods of operation.

The bed depth is the distance between an adjacent pair of plenums 34, 36, as indicated by line 58 in FIG. 3. As a guide, the bed depth may be selected to be from about 50 mm to about 1000 mm, e.g. for canola seeds the bed depth may be about 750 mm.

Figure 5:
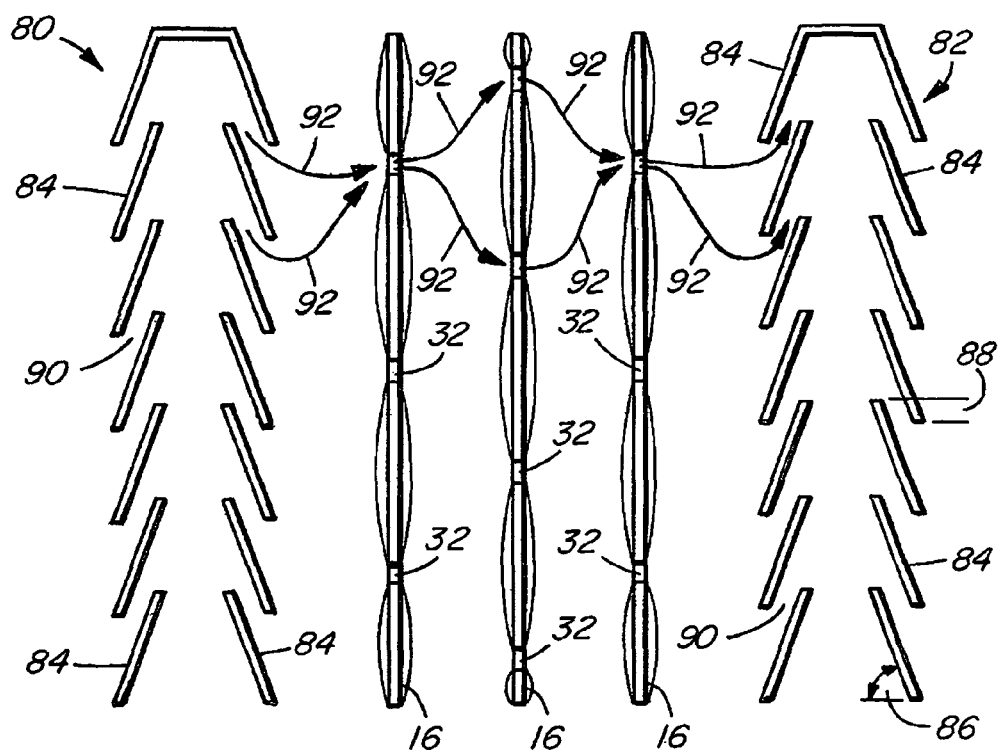
FIG. 5 is a schematical side view of an alternative embodiment of an air inlet and an air outlet plenum suitable for use with the dryer of FIG. 1.

In FIG. 5 alternative plenums i.e. air inlet plenum 80 and air outlet plenum 82, are shown.

The plenums 80, 82 differ from the plenums 34, 36 in that their air pervious sides are constructed differently. As shown, each air pervious side comprises a plurality of louvers 84.

The louvers 84 are steeply inclined, e.g. at an angle of 70°, as shown at 86. This is a typical angle to maintain mass flow of the material being dried. Adjacent louvers 84 overlap, as shown at 88, but are spaced at about 20 mm so as to define openings 90 through which the air can enter or exit.

The plenums 80, 82 are open at the bottom so that any product material being dried is sucked into the plenum 80, 82, it will fall into the stream of dried product material exiting from the bottom of the bank of plates 16.

The air flow from the inlet plenum 80 to the outlet plenum 82 is shown by the lines 92.

Figure 6:
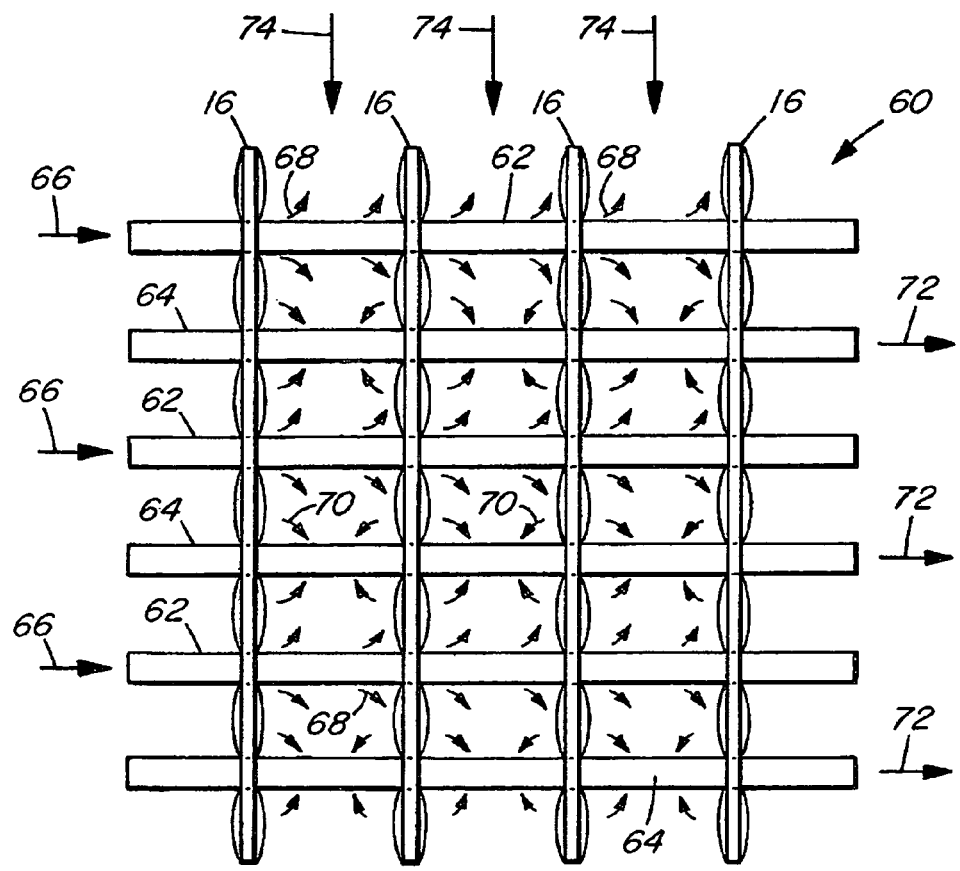
FIG. 6 is a schematical representation of a plate bank of another embodiment of a dryer for particulate material, the heat transfer plates being shown in end view.

In an alternative embodiment, the air inlet/outlet plenums 34, 36 may be replaced with air inlet/outlet pipes, 62 and 64, respectively, extending through openings in the plates 16, as shown in FIG. 6. (In FIG. 6 one plate bank of such an alternative dryer 60 is shown with the plates 16 in end view.)

The air inlet/outlet pipes 62, 64 are perforated for the passage of purge air through the pipes 62, 64 and are arranged in alternating fashion, as shown.

The air inlet pipes 62 are connected to a source of purge air for the flow of air into the pipes 62 (as indicated by arrows 66) and radially outwardly from the pipes 62 through the perforations (as indicated by the arrows 68). The air flow can be created in known fashion by the provision of one or more radial flow fans or extraction fans (not shown).

Likewise air flow is created through the air outlet pipes 64 but in the opposite direction so as to draw spent purge air into the pipes 64 through the perforations (as indicated by the arrows 70) and to exit the pipes 64 (as indicated by the arrows 72). In this way, gaseous emissions from particulate material flowing downwardly between the plates 16, as indicated by the arrows 74, is removed by the purge air flow between the pipes 62 and 64. Again, a manageable bed depth is obtained by appropriate spacing of the pipes 64, 66.

In order to handle larger capacities, multiple banks of the plates 16 can be stacked in series along the direction of flow of the material being dried. If desired, the plates may be offset between successive banks.

The dryer or evaporator according to the invention may also be used to remove volatiles from a bulk solid, e.g. the devolatization of plastic product which is contaminated with volatile solvents. For example, in the manufacture of plastic products, the plastic is formed into pellets. During the process, the pellets are purged with air or nitrogen to remove the volatile materials (solvents) on the surfaces of the pellets as well as from within the body of the material (pellets). This process is also referred to as "degassing". In such an application the particulate material 18 referred to in the description of the process would be the pellets.

Figure 7:
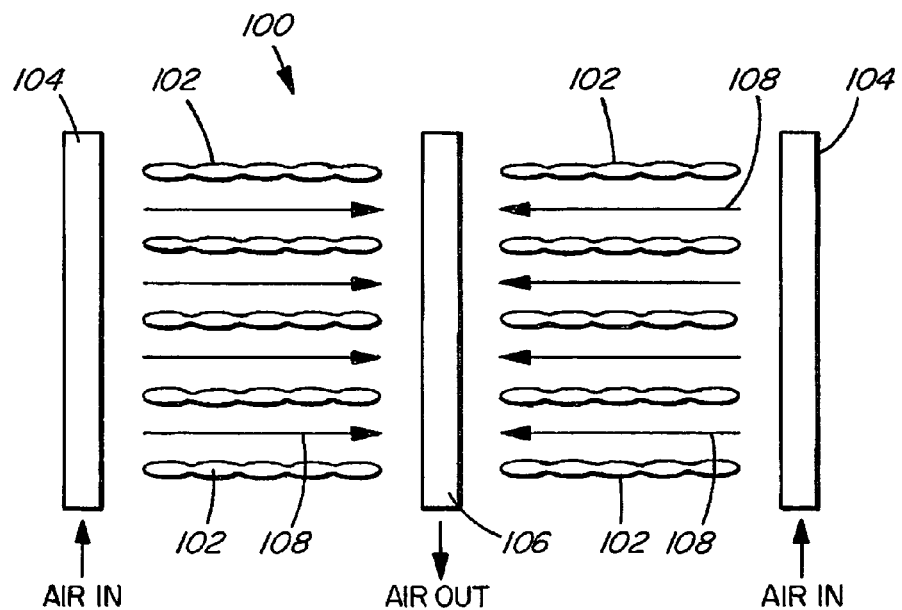
FIG. 7 is a schematical representation of the plate banks and air plenums of another embodiment of a dryer, shown in plan view.
Figure 8:
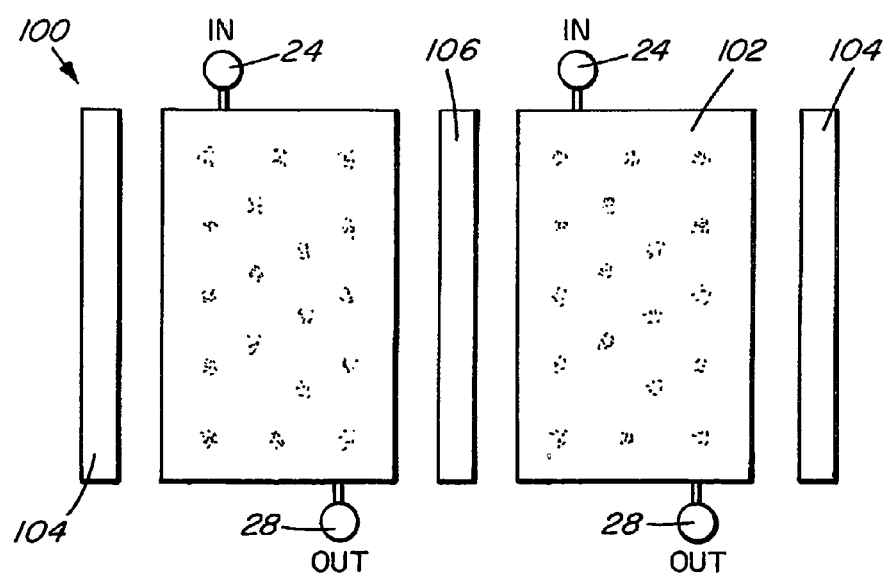
FIG. 8 is a front view of the plate banks and air plenums of the dryer of FIG. 7.

With reference to FIG. 7 and 8 reference numeral 100 generally indicates a dryer according to another embodiment. In the example shown, the dryer 100 comprises two banks of heat transfer plates 102. Although the plates 102 are dimpled they do not have holes (such as the holes 32 of the plates 16). It will be appreciated that depending on requirements less or more than two banks of plates 102 can be provided.

As in the case with the plates 16, the plates 102 have inlets which are connected to heating manifolds 24 connected to a source of heating fluid and outlets which are connected to manifolds 28 from which the spent heating fluid is discharged.

A pair of air inlet plenums 104 on the outside of the banks of plates 102 is provided and in air outlet plenum 106 is provided between the banks of plates 102.

The air inlet plenums 104 have air pervious sides facing the banks of plates 102 and the air outlet plenum 106 has a pair of opposed air pervious sides, each facing a bank of plates 102.

The air pervious sides may be of any suitable type, such as for example the wedge wire tape shown in FIG. 4 or the angled louver type as shown in FIG. 5.

In the embodiment in FIGS. 7 and 8, the plates 102 are arranged at right angles with respect to the plenums 104, 106. The flow of air from the air inlet plenums 104 between the plates 102 to the air outlet plenum 106 is shown by the arrows 108.

From the above it can be seen that in the dryers 10, 60, 100, indirect heat transfer takes place at the same time as purging with air. Other conventional drying equipment has separate heat transfer and air purge sections. This is thermally not so efficient since the air becomes saturated as the temperature falls due to evaporation that is taking place. In contrast, the dryer of the present invention keeps on adding heat through the heat transfer plates to compensate for the evaporative heat load.

A further benefit of the present invention is that the purge air will be partially reheated as it passes through the thin layer of hot product (material 18) that is adjacent to each plate 16, 102 and through the holes 32 in the plate 16. The holes 32 are offset between adjacent plates, as shown in FIG. 5, to improve the distribution of the purge air and improve the mechanism of the reheat.

The claims which follow are to be considered an integral part of the present disclosure. Although certain preferred embodiments of the present invention have been shown and described in detail, it should be understood that various changes and modifications may be made therein without departing from the scope of the appended claims. In general, in the following claims, the terms used should not be construed to limit the invention to the specific embodiments disclosed in the specification, but should be construed to include all methods and apparatuses that operate in accordance with the claims. Accordingly, the invention is not limited by the disclosure, but instead its scope is to be determined entirely by the following claims.

We claim:

1. A dryer for drying particulate material comprising:
   a plurality of heat transfer plates arranged in spaced relationship for the flow of the material to be dried therebetween, each heat transfer plate comprising:
   a pair of major opposing sides for transferring heat to the material to be dried; and
   a heating fluid inlet and a heating fluid outlet for the flow of a heating fluid through the plate;
   each heat transfer plate including a plurality of holes extending from one of the pair of major opposing sides to the other of the pair of major opposing sides; and
   at least one inlet plenum and at least one exhaust plenum, the plurality of heat transfer plates interposed between the plenums, to facilitate flow of a purge fluid in a direction across the direction of flow of the material to be dried,
   the flow of the purge fluid being from the at least one inlet plenum, through the plurality of holes extending through the heat transfer plates, to the at least one exhaust plenum,
   the flow of purge fluid being isolated from the flow of heating fluid through the heat transfer plates.

2. The dryer of claim 1, wherein the purge fluid is selected from one or more of the group consisting of air, gas and steam.

3. The dryer of claim 1, wherein each of the inlet and exhaust plenums has an air pervious side facing the heat transfer plates.

4. The dryer of claim 3, wherein said air pervious side is formed by spaced elongate members having substantially triangular cross-sectional profiles, each triangular profile having a substantially flat outwardly facing base portion.

5. The dryer of claim 3, wherein said air pervious side is formed by a plurality of transverse louvers inclined with respect to the horizontal direction, wherein air passages are defined between adjacent louvers.

6. The dryer of claim 5, wherein the louvers are inclined at an angle of about 70° with respect to the horizontal.

7. The dryer of claim 1, the dryer further comprising at least one additional plenum, wherein the heat transfer plates are arranged in banks of plates, each bank comprising a plurality of plates, the at least one additional plenum being interposed between the banks of plates.

8. The dryer of claim 7, wherein said at least one additional plenum has a pair of opposed air pervious sides.

9. The dryer of claim 1, wherein each of the heat transfer plates has a heating fluid inlet connected to a heating fluid manifold for connection to a source of heating fluid and each of the heat transfer plates has a heating fluid outlet connected to an outlet manifold for the discharge of spent heating fluid.

10. The dryer of claim 1, wherein the plurality of holes in a heat transfer plate are offset with respect to the plurality of holes in an adjacent heat transfer plate.

11. An evaporator for removing volatiles from bulk solid material comprising:
    a plurality of heat transfer plates arranged in spaced relationship for the flow of the material therebetween, each heat transfer plate comprising:
    a pair of major opposing sides for transferring heat to the material to be dried; and
    a heating fluid inlet and a heating fluid outlet for the flow of a heating fluid through the plate;
    each heat transfer plate including a plurality of holes extending from one of the pair of major opposing sides to the other of the pair of major opposing sides; and
    at least one inlet plenum and at least one exhaust plenum, the plurality of heat transfer plates interposed between the plenums, to facilitate flow of a purge fluid in a direction across the direction of flow of the material to be dried,
    the flow of the purge fluid being from the at least one inlet plenum, through the plurality of holes extending through the heat transfer plates, to the at least one exhaust plenum,
    the flow of purge fluid being isolated from the flow of heating fluid through the heat transfer plates.

12. The evaporator according to claim 11, wherein the purge fluid comprises air or gas.

13. The evaporator of claim 11, wherein each of the inlet and exhaust plenums has an air pervious side facing the heat transfer plates and said air pervious side is formed by a plurality of louvers inclined with respect to the horizontal direction wherein air passages are defined between adjacent louvers.

14. The evaporator of claim 13, wherein the louvers are inclined at an angle of about 70° with respect to the horizontal.

15. The evaporator of claim 11, wherein the plurality of holes in a heat transfer plate are offset with respect to the plurality of holes in an adjacent heat transfer plate.

* * * * *